(12) United States Patent
Polmans et al.

(10) Patent No.: US 12,097,910 B2
(45) Date of Patent: Sep. 24, 2024

(54) METHOD FOR CONTROLLING STEERING LOCKING OF A STEER-BY-WIRE STEERING SYSTEM OF A MOTOR VEHICLE

(71) Applicants: Thyssenkrupp Presta AG, Eschen (LI); Honda Motor Co., Ltd., Tokyo (JP)

(72) Inventors: Kristof Polmans, Tarrenz (AT); Imre Szepessy, Mauren (LI); Yoshinobu Watanabe, Wako (JP); Hayato Miyakawa, Wako (JP); Yosuke Ojima, Wako (JP); Munetsugu Hanji, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 17/673,871

(22) Filed: Feb. 17, 2022

(65) Prior Publication Data
US 2022/0169301 A1 Jun. 2, 2022

Related U.S. Application Data

(63) Continuation of application No. PCT/EP2019/072440, filed on Aug. 22, 2019.

(51) Int. Cl.
*B62D 5/00* (2006.01)
*B60R 25/021* (2013.01)
(Continued)

(52) U.S. Cl.
CPC ........ *B62D 5/006* (2013.01); *B60R 25/02107* (2013.01); *B60R 25/02153* (2013.01); *B60R 25/2063* (2013.01)

(58) Field of Classification Search
CPC .......... B60R 25/02153; B60R 25/0211; B60R 25/02; B60R 25/021; B60R 25/02105;
(Continued)

(56) References Cited

U.S. PATENT DOCUMENTS 5,893,429 A * 4/1999 Hackl ................... B62D 5/008
                                                           180/443
8,666,601 B1 * 3/2014 Van Wiemeersch ........................
                                                    B62D 15/0285
                                                           318/264
(Continued)

FOREIGN PATENT DOCUMENTS

DE          102 44 939 A1    4/2004
DE    10 2010 043 533 A1    5/2012
(Continued)

OTHER PUBLICATIONS

Espacenet machine translation of DE 102017104510A1 (Year: 2024).*

(Continued)

*Primary Examiner* — Kristina R Fulton
*Assistant Examiner* — Emily G. Brown
(74) *Attorney, Agent, or Firm* — Keating & Bennett, LLP

(57) ABSTRACT

A steer-by-wire steering system including a feedback actuator to simulate a steering feel to a steering device and including an electric motor connected to a steering shaft to transmit a torque, and a steering lock including a latch connected to the steering shaft in a torsion-resistant manner and a lock to engage with the latch at locking positions to block a rotation of the steering shaft. If an ignition is switched-off and a movement of the steering device is detected, a position of the steering shaft and a distance between the lock and a next locking position of the latch is determined. If the distance is greater than a predefined value, a counter-torque is transmitted to the steering shaft by the (Continued)

feedback-actuator opposite to the movement of the steering device until the locking position reaches the lock and the lock can engage with the latch.

14 Claims, 3 Drawing Sheets

(51) Int. Cl.
  *B60R 25/0215* (2013.01)
  *B60R 25/20* (2013.01)

(58) Field of Classification Search
  CPC ........ B60R 25/02156; B60R 25/02126; B60R 25/02118; B62D 5/006
  See application file for complete search history.

(56) References Cited

U.S. PATENT DOCUMENTS

| | | | | |
|---|---|---|---|---|
| 2013/0257063 | A1* | 10/2013 | Ishitsuka | E05B 81/40 292/144 |
| 2014/0249719 | A1* | 9/2014 | Gauch | B62D 5/0475 701/41 |
| 2019/0291776 | A1* | 9/2019 | Shin | B62D 5/006 |

FOREIGN PATENT DOCUMENTS

| | | | | |
|---|---|---|---|---|
| DE | 102013109527 A1 | * | 3/2015 | ........... B60R 25/021 |
| DE | 102014016017 A1 | * | 5/2016 | ............ B60R 25/02 |
| DE | 102017104510 A1 | * | 9/2018 | |
| EP | 1 234 734 A1 | | 8/2002 | |
| JP | 2001171534 A | * | 6/2001 | |
| JP | 2003175842 A | * | 6/2003 | |
| JP | 2006062465 A | * | 3/2006 | |
| JP | 2006306141 A | * | 11/2006 | |
| JP | 2008189266 A | * | 8/2008 | |
| JP | 2009090686 A | * | 4/2009 | |
| JP | 2010173592 A | * | 8/2010 | |
| JP | 2012006487 A | * | 1/2012 | |
| KR | 20120137024 A | * | 12/2012 | |
| WO | WO-2017182502 A1 | * | 10/2017 | |
| WO | WO-2019007986 A1 | * | 1/2019 | |
| WO | WO-2019011985 A1 | * | 1/2019 | ............ B60W 30/09 |

OTHER PUBLICATIONS

Espacenet machine translation of JP 2003175842A (Year: 2024).*
Espacenet machine translation of JP 2006306141A (Year: 2024).*
Espacenet machine translation of JP 2008189266A (Year: 2024).*
Espacenet machine translation of JP 2009090686A (Year: 2024).*
Espacenet machine translation of WO 2017/182502 A1 (Year: 2024).*
Official Communication issued in International Patent Application No. PCT/EP2019/072440, mailed on Aug. 31, 2020.

* cited by examiner

METHOD FOR CONTROLLING STEERING LOCKING OF A STEER-BY-WIRE STEERING SYSTEM OF A MOTOR VEHICLE

CROSS REFERENCE TO RELATED APPLICATIONS

This application claims the benefit of priority to PCT Application No. PCT/EP2019/072440 filed on Aug. 22, 2019, the entire contents of which are hereby incorporated herein by reference.

BACKGROUND OF THE INVENTION

1. Field of the Invention

The present invention relates to a method for controlling steering locking of a steer-by-wire steering system of a motor vehicle.

2. Description of the Related Art

In a steer-by-wire steering system, the vehicle s steering wheel is disengaged from the steering mechanism. Steering movement is achieved by a steering actuator with an electric motor. The steering actuator operates in response to detected values of various steering parameters, such as steering wheel angle and vehicle speed, etc. The detected values are communicated electronically to the steering actuator from sensors, whereby the electric motor drives the rack and orients the steerable wheels in the desired direction.

Even thouqh the mechanical linkage between the steering wheel an the road wheels has been eliminated, a steer-by-wire steering system is expected to produce the same functions and steering feel as a conventional mechanically linked steering system. The forces generated in moving the road wheels have to be fed back to the steering wheel to provide information for directional control of the vehicle to the driver. The feedback also contributes to a feeling of steering referred to as steering feel. In steer-by-wire steering systems, the feedback and steering feel respectively is generated with a feedback actuator connected to the steering wheel.

Steering columns include locking devices, the so-called steering lock, which is intended to secure the parked vehicle against unauthorized use and to block the steering wheel, which is often used as a handle to facilitate getting into and out of the vehicle.

DE 10 2017 104 510 A1 discloses a steering column of a steer-by-wire steering system with an electrically actuated steering lock. A latching star is arranged on an outer part of the steering shaft, in which a latching bolt, connected to the chassis via a sleeve assembly, can engage in a known manner in order to arrest the steering shaft $\alpha$ nd therefore prohibit a steering procedure to prevent unauthorized use of the motor vehicle. However, in between the snap-in positions of the latching bolt, the steering wheel moves freely which is very uncomfortable for the driver, if the driver uses the steering wheel as a handle to get in or out of the car.

SUMMARY OF THE INVENTION

Preferred embodiments of the present invention provide methods for controlling steering locking of steer-by-wire steering systems of motor vehicles, each of which generates a better steering lock.

According to a preferred embodiment of the present invention, a method for controlling steering locking of a steer-by-wire steering system of a motor vehicle, the steer-by-wire steering system including a feedback actuator to simulate a steering feel to a steering device, wherein the feedback actuator includes an electric motor with a motor shaft connected to a steering shaft to be able to transmit a torque, and a steering lock with a latch connected to the steering shaft in a torsion-resistant manner and a lock to engage with the latch at locking positions to block a rotation of the steering shaft, includes, if an ignition is switched-off and a movement of the steering device is detected, determining a position of the steering shaft $\alpha$ nd a distance between the lock and a next one of the locking positions of the latch in a direction of movement of the steering device, and if the distance is greater than a predefined value, transmitting a counter-torque to the steering shaft by the feedback-actuator in a direction opposite to the movement of the steering device until the locking position reaches the lock and the lock can engage with the latch.

According to this method, after the power is switched-off and driver uses the steering device, in particular the steering wheel as a handle, the actuator generates a torque, which makes steering difficult until the rotation of the steering shaft is locked. This mimics the same feeling as the driver experiences in electromechanical steering systems. The angular distance between the locking positions is preferably between about 210 degrees and about 360 degrees for one-locking-position systems. The angular distance between the locking positions is preferably between about 150 degrees and about 210 degrees for two-locking-position systems. The angular distance between the locking positions is preferably between about 20 degrees and about 40 degrees, more preferably between about 30 and about 40 degrees for systems with more than two locking positions.

Preferably, position sensors are used to determine the relative position between the latch and the lock of the steering lock. The feedback actuator can be kept active as long as the driver is still in the vehicle or can be made active when it is detected that the driver unlocks the vehicle. Even though the ignition is off, the feedback actuator is connected to a power source.

Preferably, the counter-torque applied by the feedback actuator to the steering shaft is depending on the determined distance between the lock and the next locking position in a direction of movement of the steering device.

It is advantageous, if the counter-torque increases with decreasing angular distance between the lock and the next locking position in a direction of movement of the steering device. Preferably, the increase is determined by an exponential function.

The driver's feeling is further improved, if the maximum counter-torque generated by the feedback actuator is reached during engagement of the lock into the latch at the next locking position in a direction of the steering wheel movement. Preferably, the transition from the counter-torque generated by the feedback actuator and the torque generated by mechanical blocking of the steering lock over the angular position of the steering shaft is continuous and can be constantly differentiated.

The method can further include, if the ignition is switched-off and no movement of the steering device is detected within a predefined time interval, actively rotating the steering shaft by the feedback actuator until a closest one of the locking positions, irrespective of a direction of rotation, reaches the lock and the lock can engage with the latch.

As a result, it is assured that the steering lock locks the rotation of the steering, if, for example, the driver unlocks the car and gets in, because the locking already occurred before the driver locked the car.

In a preferred embodiment of the present invention, a spring pretensions the lock inwardly, in an radial direction with respect to the rotational axis of the steering shaft.

The latch can include a latching star with a discrete number of equal recesses and equal protrusions on the outer surface, next to each other and evenly spaced in a circumferential direction and the lock can include a latching bolt, wherein positions of the recesses define locking or snap-in positions of the latching bolt.

It is preferred that the steering shaft includes an inner shaft α nd an outer shaft rotatable around an axis of rotation and with compatible outer and inner profiles so that two steering shaft portions can engage in one another and provide a torsion-resistant telescopic arrangement. In this case, it is preferred that the latching star circumferentially surrounds the outer shaft α nd is fastened to the outer shaft in a torsion-resistant manner. The feedback actuator preferably acts on the outer shaft. Further, a tolerance ring can be used, which is coaxially located between the outer shaft α nd the latching star.

Preferred embodiments of the present invention are described below with respect to the drawings. In all figures, the same reference signs denote the same components or functionally similar components.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
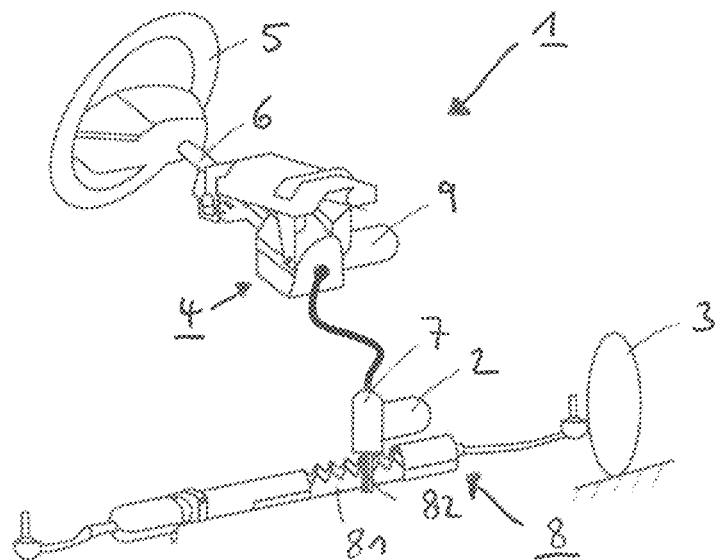
FIG. 1 shows a steer-by-wire steering system in a schematic illustration.

FIG. 1 is a schematic representation of a steer-by-wire steering system 1 that includes an actuation control system 2 to actuate road wheels 3 and a feedback actuator 4 to simulate the steering feel of a conventional mechanically linked steering system. A steering device 5, such as a steering wheel, is connected to a steering shaft 6. Unillustrated position sensors and a torque sensor are operably connected to steering shaft 6. Position sensors electronically detect the angular position of the steering shaft 6, while the torque sensor electronically detects and evaluates the torsional force acting on the steering shaft 6. The angular displacement of the steering wheel 5 is detected, transmitted to the actuation control system 2, processed in the actuation control system 2, and applied to a servo motor 7 to move the steerable road wheels 3 via a rack 81 and pinion 82 system 8.

The feedback actuator 4 includes an electric motor 9 having a motor shaft rotatably driven by the motor 9 and connected to the steering shaft 6 (not shown). Since there is no direct mechanical coupling between the actuation control system and the steerable wheels, the driver does not receive any feedback from the road surface through the steering mechanism. Therefore, the feedback actuator 4 generates a reaction torque to the steering wheel 5, based upon a number of steering parameters such as vehicle speed, steering device angle, the steering device angle speed, the steering device turning acceleration, the yaw rate of the vehicle, road surface condition, and further driving parameters of the vehicle.

Figure 2:
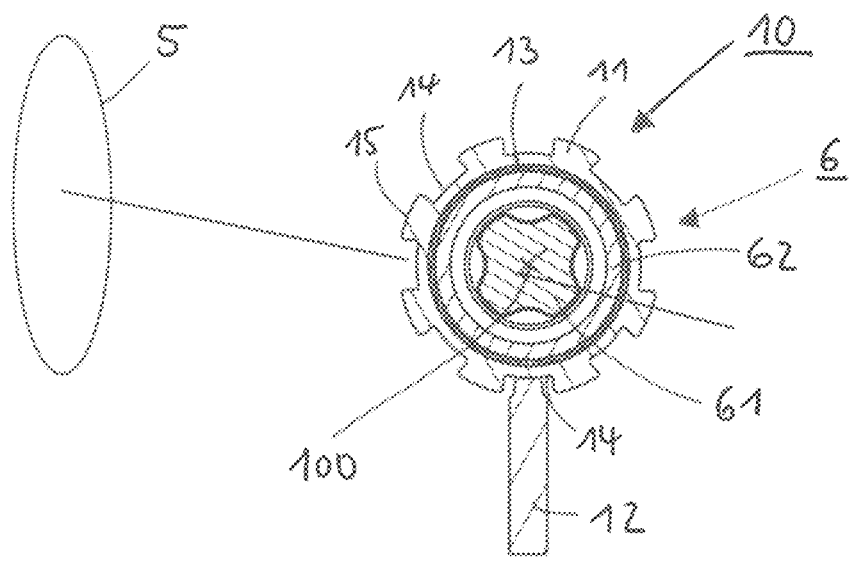
FIG. 2 shows a cross-section of a steering shaft with a steering lock unit in a locked position.

FIG. 2 shows a steering lock unit 10 including a latching star 11 and a latching bolt 12, the latching star 11 being illustrated in an engaged position. The steering shaft 6 includes an inner shaft 61 and an outer shaft 62 rotatable around an axis of rotation 100. The inner shaft 61 includes a non-circular, in particular, an approximately cloverleaf-shaped, outer profile. The outer shaft 62 includes a correspondingly compatible inner profile so that the two steering shaft portions can engage one another and provide a torsion-resistant telescopic arrangement. The steering wheel 5 connected to the steering shaft is schematically shown next to the cross-section.

The latching star 11 circumferentially surrounds the outer shaft 62 and is fastened to the outer shaft 62 in a torsion-resistant manner.

A tolerance ring 13 is coaxially located between the outer shaft 62 and the latching star 11. The tolerance ring 13 makes it possible for the latching star 11 to be moved relative to the outer shaft 62 if a predetermined torque is exceeded, acting like a overload clutch, thus avoiding unwanted damage.

A discrete number of equal recesses 14 and equal protrusions 15 are provided on the outer surface of the latching star 11, next to each other and evenly spaced in circumferential direction. The positions of the recesses 14 define the locking or snap-in positions of the latching bolt 12. The angular distance between the locking positions, defined as the middle of the recesses 14 in a circumferential direction, can be, for example, between about 30 degrees and about 40 degrees. The latching bolt 12 can be moved into the recesses 14 of the latching star 11 so that the steering shaft 6 is blocked with play in its rotational movement, as shown in FIG. 2. The play of the mechanical blocking is defined by the width of the recesses 14 in relation to the width of the latching bold 12 in the area of engagement.

To release the steering shaft 6, the latching bolt 12 is moved outwardly in a radial direction with respect to the rotational axis of the steering shaft 100 and out of the recess 14 of the latching star.

Figure 3:
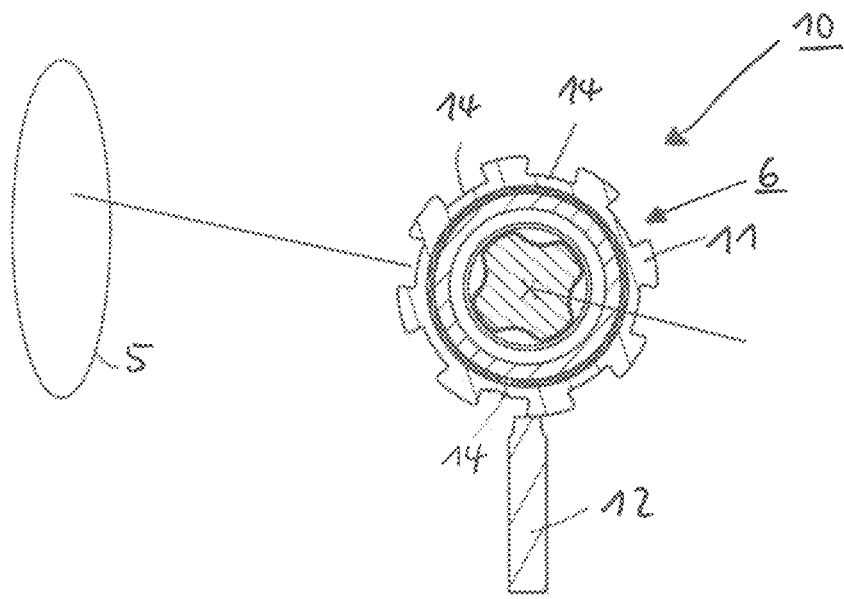
FIG. 3 shows a cross-section of a steering shaft with the steering lock unit in an unlocked position.
Figure 4:
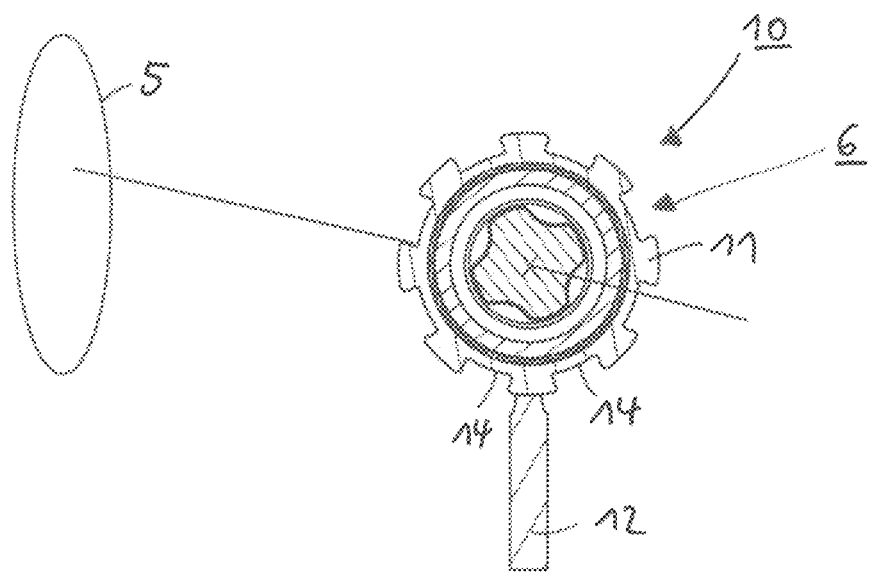
FIG. 4 shows a cross-section of a steering shaft with the steering lock unit in another unlocked position.

FIGS. 3 and 4 show unlocked positions of the steering lock unit 10.

It is likely, that in the event where the ignition is switched off and the driver wants to use the steering wheel as a handle, either to get into the vehicle or out of the vehicle, the steering shaft 6 is in an angular position, where the steering lock unit 10 cannot lock the rotation of the steering shaft 6, because the latching bolt 12 can not engage with a recess 14 of the latching star 11. In this case, the steering wheel 5 will move freely, which is very uncomfortable for the driver. To overcome the free movement of the steering wheel, the feedback actuator (not shown) is used to introduce a counter-torque $T_{FBA}$, in a direction opposite to the steering wheel movement implied by the driver, until a lock position is reached. The feedback actuator has power to do so even if the ignition is switched off.

Figure 5:
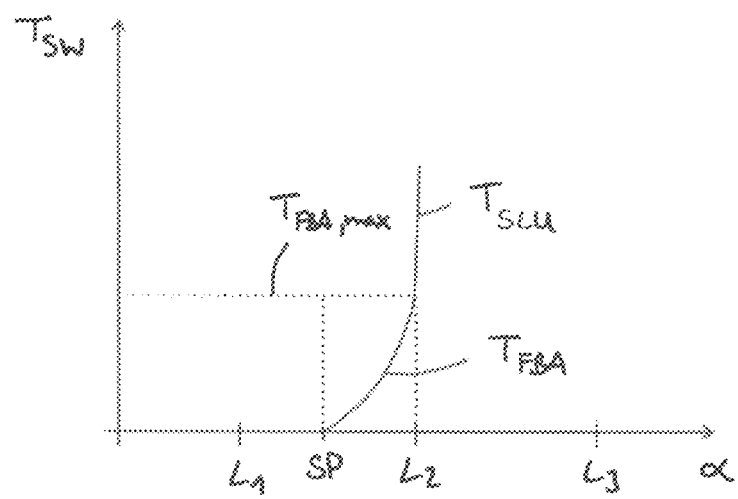
FIG. 5 shows a diagram of a torque applied by the feedback actuator to the steering shaft in dependence of an angular steering wheel position.

Preferably, the counter-torque $T_{FBA}$ depends on the angular distance between the actual angular position of the steering shaft 6 and the next locking position in a direction of the steering wheel movement, as shown in FIG. 5. This counter-torque $T_{FBA}$ makes angular movement of the steering wheel difficult.

FIG. 5 shows the counter-torque $T_{FBA}$ applied by the feedback actuator to the steering shaft in dependence of an angular steering wheel position. The torque hindering a steering wheel movement $T_{sw}$ is plotted against the steering wheel angle α. The three dashes on the x-axis represent three consecutive locking positions $L_1$, $L_2$, $L_3$.

The angular steering wheel position at switch-off of the ignition defines the starting point SP. The starting point SP lies in between two locking points. The next locking position in a direction of movement of the steering wheel introduced by the driver is locking position $L_2$. It is preferred that the counter-torque $T_{FBA}$ increases with decreasing angular distance of the actual steering wheel position to the next locking position. This behavior is known from electromechanically steering systems given by the rotation of the steering wheel against road wheel friction. The increase can be described by an exponential function. The maximum torque generated by the feedback actuator $T_{FBA,max}$ shall be reached during engagement of the latching bold into the latching star at the next locking position in a direction of the steering wheel movement, which corresponds to $L_2$ in the shown example. The transition from the counter-torque generated by the feedback actuator $T_{FBA}$ and the torque generated by mechanical blocking of the steering lock unit $T_{SLU}$ over the angular position of the steering shaft α is preferably continuous and can be constantly differentiated so as to prevent singularities.

In addition it is possible that the feedback actuator actively moves the steering wheel to the closest locking position irrespective of the direction of rotating to actively lock the steering wheel.

Preferably, the feedback actuator acts on the outer shaft.

In a preferred embodiment of the present invention, an electric motor moves the latching bolt in and out of the latching star for locking and unlocking.

It is also possible to use a latching bolt, which is pretensioned inwardly in a radial direction with respect to the rotational axis of the steering shaft by a spring.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for controlling steering locking of a steer-by-wire steering system of a motor vehicle, the steer-by-wire steering system including a feedback actuator to simulate a steering feel to a steering device, wherein the feedback actuator includes an electric motor with a motor shaft connected to a steering shaft to be able to transmit a torque, and a steering lock with a latch connected to the steering shaft in a torsion-resistant manner and a lock to engage with the latch at locking positions to block a rotation of the steering shaft, the method comprising:
   if an ignition is switched-off and a movement of the steering device is detected, determining a position of the steering shaft α nd a distance between the lock and a next one of the locking positions of the latch in a direction of movement of the steering device; and
   if the distance is greater than a predefined value, transmitting a counter-torque to the steering shaft by the feedback-actuator in a direction opposite to the movement of the steering device until the next one of the locking positions reaches the lock and the lock can engage with the latch; wherein
   the counter-torque increases with decreasing angular distance between the lock and the next one of the locking positions in the direction of movement of the steering device.

2. The method according to claim 1, wherein the counter-torque applied by the feedback actuator to the steering shaft depends on the determined distance between the lock and the next one of the locking positions in the direction of movement of the steering device.

3. The method according to claim 1, wherein the increase in the counter-torque is described by an exponential function.

4. The method according to claim 1, wherein a maximum counter-torque generated by the feedback actuator is reached during engagement of the lock in the latch at the next one of the locking positions in a direction of steering device movement.

5. The method according to claim 1, wherein a transition from the counter-torque generated by the feedback actuator to a torque generated by mechanical blocking by the steering lock is continuous and is capable of being constantly differentiated during a rotation of the steering shaft.

6. The method according to claim 1, further comprising if the ignition is switched-off and no movement of the steering device is detected within a predefined time interval, actively rotating the steering shaft by the feedback actuator until a closest one of the locking positions, irrespective of a direction of rotation, reaches the lock and the lock can engage with the latch.

7. The method according to claim 1, wherein a spring pretensions the lock inwardly in an radial direction with respect to a rotational axis of the steering shaft.

8. The method according to claim 1, wherein the latch includes a latching star with a discrete number of equal recesses and equal protrusions arranged on an outer surface, next to each other and evenly spaced in a circumferential direction and the lock includes a latching bolt, wherein positions of the recesses define locking or snap-in positions of the latching bolt.

9. The method according to claim 1, wherein the steering shaft includes an inner shaft and an outer shaft rotatable around an axis of rotation with compatible outer and inner profiles so that two steering shaft portions are engageable with one another to provide a torsion-resistant telescopic arrangement.

10. The method according to claim 9, wherein a latching star circumferentially surrounds the outer shaft α nd is fastened to the outer shaft in a torsion-resistant manner.

11. The method according to claim 9, wherein the feedback actuator acts on the outer shaft and the inner shaft is connected to the steering device.

12. The method according to claim 9, wherein a tolerance ring is coaxially located between the outer shaft and a latching star.

13. The method according to claim 1, wherein an angular distance between the locking positions is between about 20 degrees and about 40 degrees.

14. The method according to claim 13, wherein the angular distance between the locking positions is between about 30 degrees and about 40 degrees.

\* \* \* \* \*